UNITED STATES PATENT OFFICE.

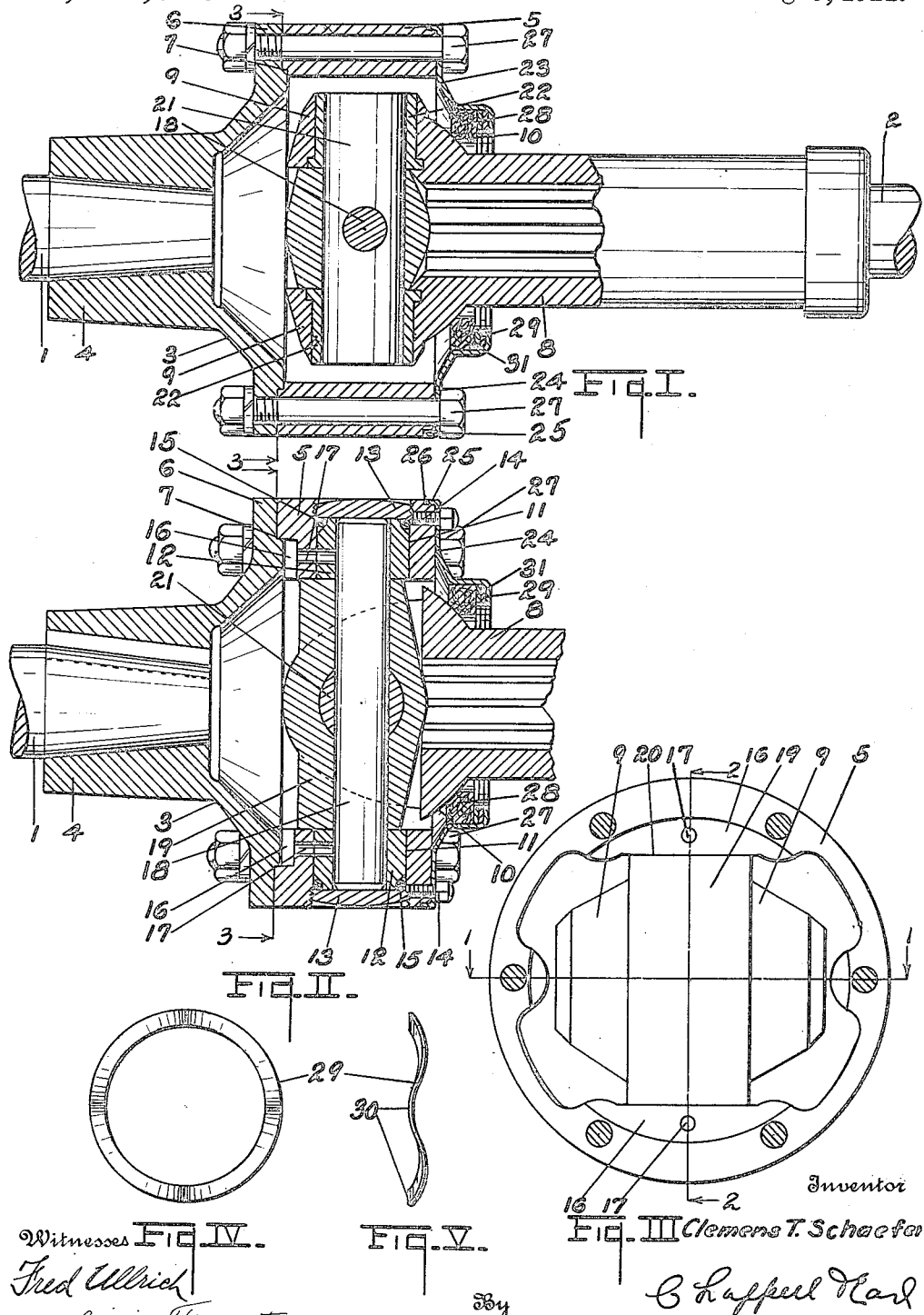
C. T. SCHAEFER.
UNIVERSAL JOINT.
APPLICATION FILED OCT. 9, 1920.
1,386,735. Patented Aug. 9, 1921.

CLEMENS T. SCHAEFER, OF ANDERSON, INDIANA, ASSIGNOR TO ARVAC MANUFACTURING COMPANY, OF ANDERSON, INDIANA.

UNIVERSAL JOINT.

1,386,735.      Specification of Letters Patent.      Patented Aug. 9, 1921.

Application filed October 9, 1920. Serial No. 415,841.

*To all whom it may concern:*

Be it known that I, CLEMENS T. SCHAEFER, a citizen of the United States, residing at Anderson, county of Madison, State of Indiana, have invented certain new and useful Improvements in Universal Joints, of which the following is a specification.

This invention relates to improvements in universal joints.

The main objects of this invention are:

First, to provide an improved universal joint in which the bearing parts are effectively housed and lubricated.

Second, to provide an improved universal joint in which the parts are simple and economical to produce and assemble and are compactly arranged and at the same time are strong and durable.

Further objects and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a detail side view of a universal joint embodying the features of my invention, partially in central longitudinal section on a line corresponding to line 1—1 of Fig. III.

Fig. II is a detail view mainly in longitudinal section on line corresponding to line 2—2 of Fig. III.

Fig. III is a transverse section on line corresponding to line 3—3 of Figs. I and II.

Fig. IV is a side view of the packing thrust ring for the packing ring or member.

Fig. V is an edge view thereof.

In the drawing similar reference characters refer to similar parts throughout the several views, and the sectional views are taken looking in the direction of the little arrows at the ends of the section lines.

Referring to the drawings, 1 and 2 represent the shaft sections to be coupled. I provide an outer shaft member designated generally by the numeral 3 formed of sections 4 and 5. The section 4 is adapted to receive the tapered end of the shaft 1 and has an outwardly projecting flange 6 having shoulder 7 on which the annular body section 5 fits. This shaft member 3 is adapted as a housing member and lubricant receptacle. The shaft member 8 is provided with forks or arms 9 and has a spherically curved rear face or surface 10. The outer shaft member has journal pin openings 11 in which the bushings 12 are disposed. These bushings are retained by the screws 13, the screws being in turn retained by the set screws 14. The gaskets 15 are arranged between the ends of the bushings and screws 13.

The body section 5 of the outer shaft member has recesses 16 formed therein which coact with the flange 6 in providing lubricant pockets. Passages 17 lead from these pockets through the bushings 12 to the journal pin 18 so that as the joint revolves the lubricant is thrown outwardly into these pockets and carried through the passage 17 to the journal pin, thereby effectively lubricating the same.

The journal member 19 is arranged in the body section 5 of the outer shaft member with its ends in bearing engagement with the bearing surface 20 thereof. The journal pin 21 is arranged through this journal member and has bearings in the bushing 22 in the arms of the shaft member 8, see Fig. I. The journal pin 18 is disposed through the journal member and through the journal pin 21.

The annular housing or closure member 23 provided with an outwardly projecting flange 24 disposed against the end of member 5 and having a rim 25 fitting in a rabbet-like recess 26 in the member 5. Bolts 27 are disposed through the body member 5 the flange 6 and the flange 24 of this housing member 23 clamping them all together as is clearly shown in Fig. I.

A packing ring 28 is arranged within the closure member to coact with the spherical surface of the shaft member 8. A pressure ring 29 having lateral wave-like spring bends 30 therein is disposed in the member 23 to urge the packing member against the shaft member, a bearing or thrust ring 31 being disposed between the spring member and the packing member.

With the parts thus arranged I provide a joint in which the parts are comparatively simple and economical to produce, are effectively lubricated, and the joint is compact in proportion to its strength.

Having thus described my invention, what I claim as new and desire to secure by Letters Patent, is:

1. In a universal joint, the combination of an outer shaft member constituting a housing member and comprising a shaft receiving section provided with a flange having a shouldered face and an annular body section fitting said shoulder of said flange and having external rabbet-like recesses at its outer end, an inner forked shaft member having a spherically curved rear surface, a journal member arranged within the outer shaft member, a journal pin for the inner shaft member carried by said journal member, a second journal pin carried by the outer shaft member disposed through said journal member, an annular closure member embracing said inner shaft member and provided with an outwardly projecting flange having a rim at its edge fitting in the said rabbet-like recess of said body member, bolts disposed through said outer shaft member sections and said closure member for securing such parts together, and a packing ring within said closure member coacting with the spherical surface of said inner shaft member.

2. In a universal joint, the combination of an outer shaft member constituting a housing member and comprising a shaft receiving section provided with a flange, an annular body section disposed against said flange having external rabbet-like recesses at its outer end, an inner forked shaft member having a spherically curved rear surface, a journal member arranged within the outer shaft member, a journal pin for the inner shaft member carried by said journal member, a second journal pin carried by the outer shaft member disposed through said journal member, an annular closure member embracing said inner shaft member and provided with an outwardly projecting flange disposed against the outer end of said body member, bolts disposed through said outer shaft member sections and said closure member for securing such parts together, and a packing ring within said closure member coacting with the spherical surface of said inner shaft member.

3. In a universal joint, the combination of an outer shaft member constituting a housing member and comprising a shaft receiving section provided with a flange and an annular body section disposed against said flange and having recesses in its inner face coacting with said flange providing lubricant pockets, an inner forked shaft member having a spherically curved rear surface, a journal member arranged within the outer shaft member, a journal pin for the inner shaft member carried by said journal member, a second journal pin carried by the outer shaft member disposed through said journal member and journaled in said outer shaft member, there being oil passages in said outer shaft member leading from said lubricant pockets to said second journal pin, an annular closure member embracing said inner shaft member and provided with an outwardly projecting flange disposed against the outer end of said body member, means for securing said outer shaft member sections and said closure member together, and a packing ring within said shaft member coacting with the spherical surface of said inner shaft member.

4. In a universal joint, the combination of an outer shaft member constituting a housing member and comprising a shaft receiving section provided with a flange and an annular body section disposed against said flange, an inner forked shaft member having a spherically curved surface, a journal member arranged within the outer shaft member, a journal pin for the inner shaft member carried by said journal member, a second journal pin carried by the outer shaft member disposed through said journal member and journaled in said outer shaft member, an annular closure member embracing said inner shaft member and provided with an outwardly projecting flange disposed against the outer end of said body member, bolts disposed through said outer shaft member sections and said closure member for securing said parts together, a packing ring within said shaft member coacting with the spherical surface of said inner shaft member, and a spring thrust ring for said packing ring having lateral wave-like spring bends therein.

In witness whereof, I have hereunto set my hand and seal in the presence of two witnesses.

CLEMENS T. SCHAEFER. [L. S.]

Witnesses:
R. O. BRIGHT,
WALTER WHITANE.